(12) United States Patent
Goble

(10) Patent No.: US 7,533,689 B2
(45) Date of Patent: May 19, 2009

(54) EXCESS FLOW CONTROL VALVE

(75) Inventor: Gregory Harlan Goble, Lake Forest, CA (US)

(73) Assignee: R.W. Lyall Company, Inc., Corona, CA (US)

( * ) Notice: Subject to any disclaimer, the term of this patent is extended or adjusted under 35 U.S.C. 154(b) by 265 days.

(21) Appl. No.: 11/445,055

(22) Filed: Jun. 1, 2006

(65) Prior Publication Data

US 2007/0277885 A1   Dec. 6, 2007

(51) Int. Cl.
  *F16K 17/00* (2006.01)
  *F16K 15/00* (2006.01)
  *F16K 31/12* (2006.01)
(52) U.S. Cl. ............... 137/460; 137/517; 137/15.19
(58) Field of Classification Search .......... 137/459, 137/460, 461, 504, 536, 15.19, 315.03, 315.04, 137/315.33, 315.11, 454.2, 517
See application file for complete search history.

(56) References Cited

U.S. PATENT DOCUMENTS

| | | | |
|---|---|---|---|
| 2,775,927 A | 1/1957 | Wulle | |
| 2,861,510 A | 11/1958 | Wulle | |
| 3,170,481 A | 2/1965 | Presnell | |
| 3,240,222 A * | 3/1966 | Heil | ............... 137/595 |
| 3,438,389 A | 4/1969 | Lupin | |
| 3,872,884 A | 3/1975 | Busdiecker et al. | |
| 3,918,481 A | 11/1975 | Doe et al. | |
| 4,080,993 A | 3/1978 | Lind, Jr. | |
| 4,112,978 A | 9/1978 | Olbrich et al. | |
| 4,257,452 A | 3/1981 | Hill et al. | |
| 4,838,584 A | 6/1989 | Dierksmeier | |
| 4,958,657 A | 9/1990 | Hagan et al. | |
| 5,209,523 A | 5/1993 | Godeau | |
| 5,462,081 A | 10/1995 | Perusek et al. | |
| 5,465,751 A * | 11/1995 | Newton | ............... 137/498 |
| 5,524,670 A * | 6/1996 | Castle | ............... 137/504 |
| 5,551,476 A | 9/1996 | McGinnis | |
| 5,613,518 A | 3/1997 | Rakieski | |
| 5,901,985 A | 5/1999 | Raatz | |
| 5,931,191 A * | 8/1999 | Taube et al. | ............... 137/594 |
| 6,003,550 A * | 12/1999 | Saarem et al. | ............ 137/614.17 |
| 6,195,910 B1 | 3/2001 | Robineau | |
| 6,315,333 B1 | 11/2001 | Collins | |
| 6,848,723 B2 | 2/2005 | Johnson | |
| 2004/0221893 A1 | 11/2004 | Johnson | |
| 2005/0263191 A1* | 12/2005 | Jernigan et al. | ............... 137/540 |
| 2006/0082037 A1* | 4/2006 | Al-Dahhan | ............... 267/179 |

* cited by examiner

*Primary Examiner*—John Rivell
*Assistant Examiner*—Atif H Chaudry
(74) *Attorney, Agent, or Firm*—Fulwider Patton LLP

(57) ABSTRACT

A poppet mounted concentrically on a barrel for axial travel downstream relative thereto from an open to closed position, the poppet biased by a coil sprint to its open position.

4 Claims, 5 Drawing Sheets

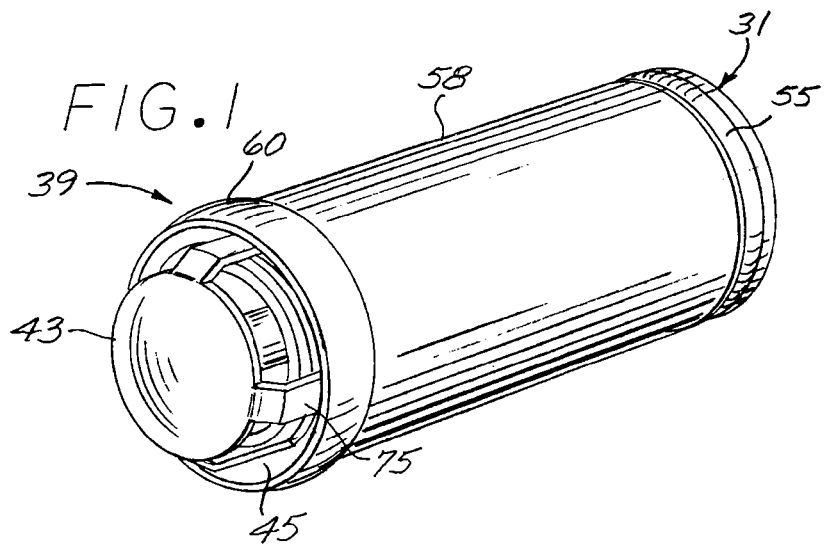
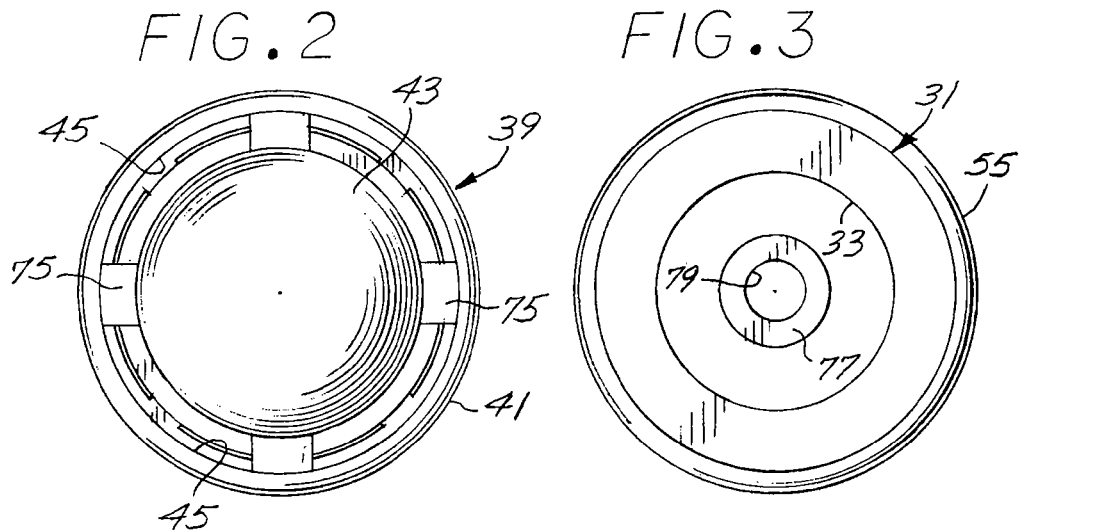
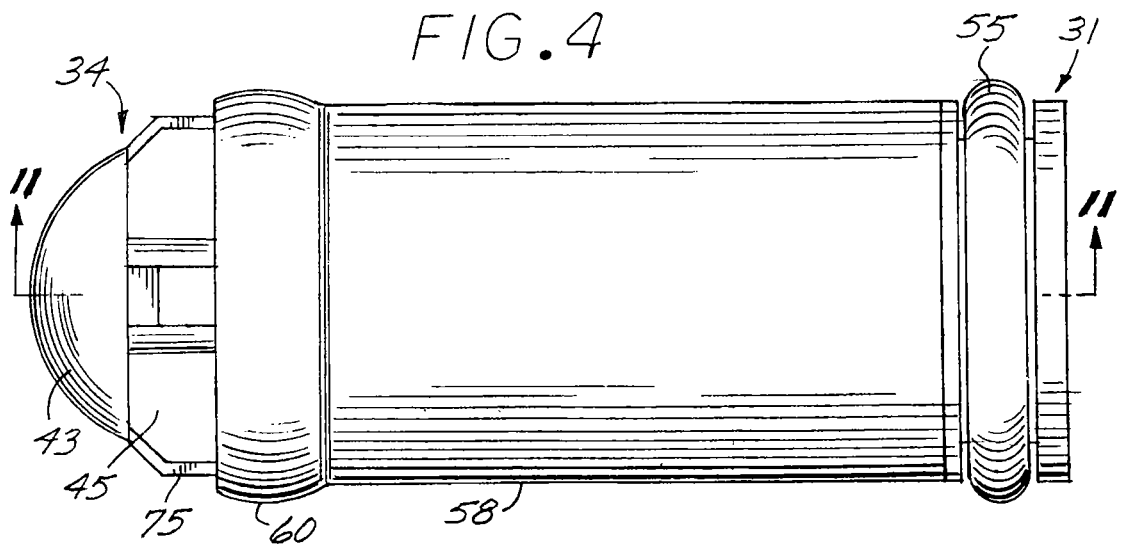

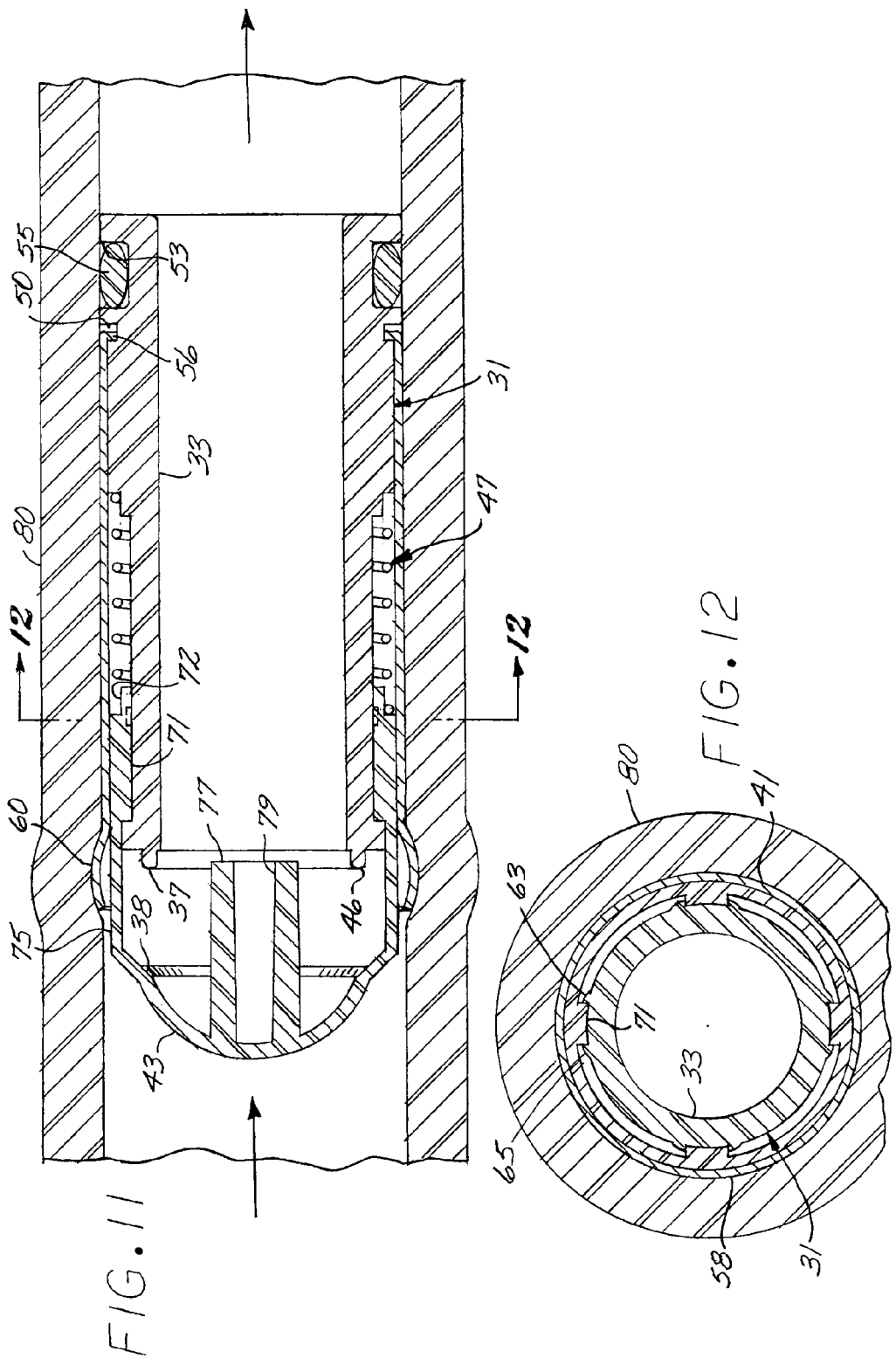

EXCESS FLOW CONTROL VALVE

BACKGROUND OF THE INVENTION

1. Field of the Invention

The present invention relates to valve devices responsive to an upsurge in flow rate to throttle or shut off the flow.

2. Description of the Prior Art

Natural gas is recognized as a relatively clean and inexpensive fuel source. Distribution systems are typically installed as part of a metropolitan or residential infrastructure to supply gas to the end users. Typically, a main gas line is laid and branch lines fed off the main line to the sites for individual gas meters, appliances, and the like. Natural gas is recognized as having high flammability such that uncontrolled escape thereof by rupture of the gas pipe line or branch line can create an extremely hazardous situation. An escape of natural gas into a confined space and exposure to any spark or any other ignition source can create an extremely volatile explosion.

In recognition of this fact, numerous different excess flow shut off valves have been proposed and are intended to be responsive to a abnormal surge in gas flow to close or throttle to thus minimize or stop gas flow. Typical of prior excess flow control valves are poppets biased to an open position by an internal coil spring which is responsive to a sudden pressure drop to discontinue flow. Such devices are made up of multiple machined components rendering them relatively expensive and often times provide a rather circuitous flow path, sometimes occupied in part by a coil spring which may hinder flow or otherwise add to the turbulence of flow thereby creating an unwanted pressure drop during normal operation.

SUMMARY OF THE INVENTION

The excess flow control valve of the present invention includes a barrel defining a valve body having a through passage and formed on its upstream end with a valve seat. A poppet cage received in telescopical relationship with the upstream end of the barrel is formed with radially opening inlet ports and is closed on its upstream end by a poppet cap having a downstream facing peripheral seal surface which is operative to, when the poppet is in its closed position, throttle or stop flow past the valve seat. The poppet is biased is upstream with a predetermined force by means of a coil spring about the body barrel.

Other features and advantages of the invention will become apparent from the following detailed description, taken in conjunction with the accompanying drawings which illustrate, by way of example, the features of the invention.

BRIEF DESCRIPTION OF THE DRAWINGS

FIG. 1 is a perspective view of an excess control valve embodying the present invention;

FIG. 2 is a left hand end view thereof, in enlarge scale;

FIG. 3 is a right hand end view thereof, in enlarge scale;

FIG. 4 is front view, in enlarge scale, of the valve shown in FIG. 1;

FIG. 11 is a longitudinal sectional view, in enlarge scale, of the excess flow control valve shown in FIG. 1 mounted in a fluid flow conduit;

FIG. 12 is a transverse sectional view taken along the line 12-12 of FIG. 11;

DETAILED DESCRIPTION OF THE PREFERRED EMBODIMENTS

Figure 5:
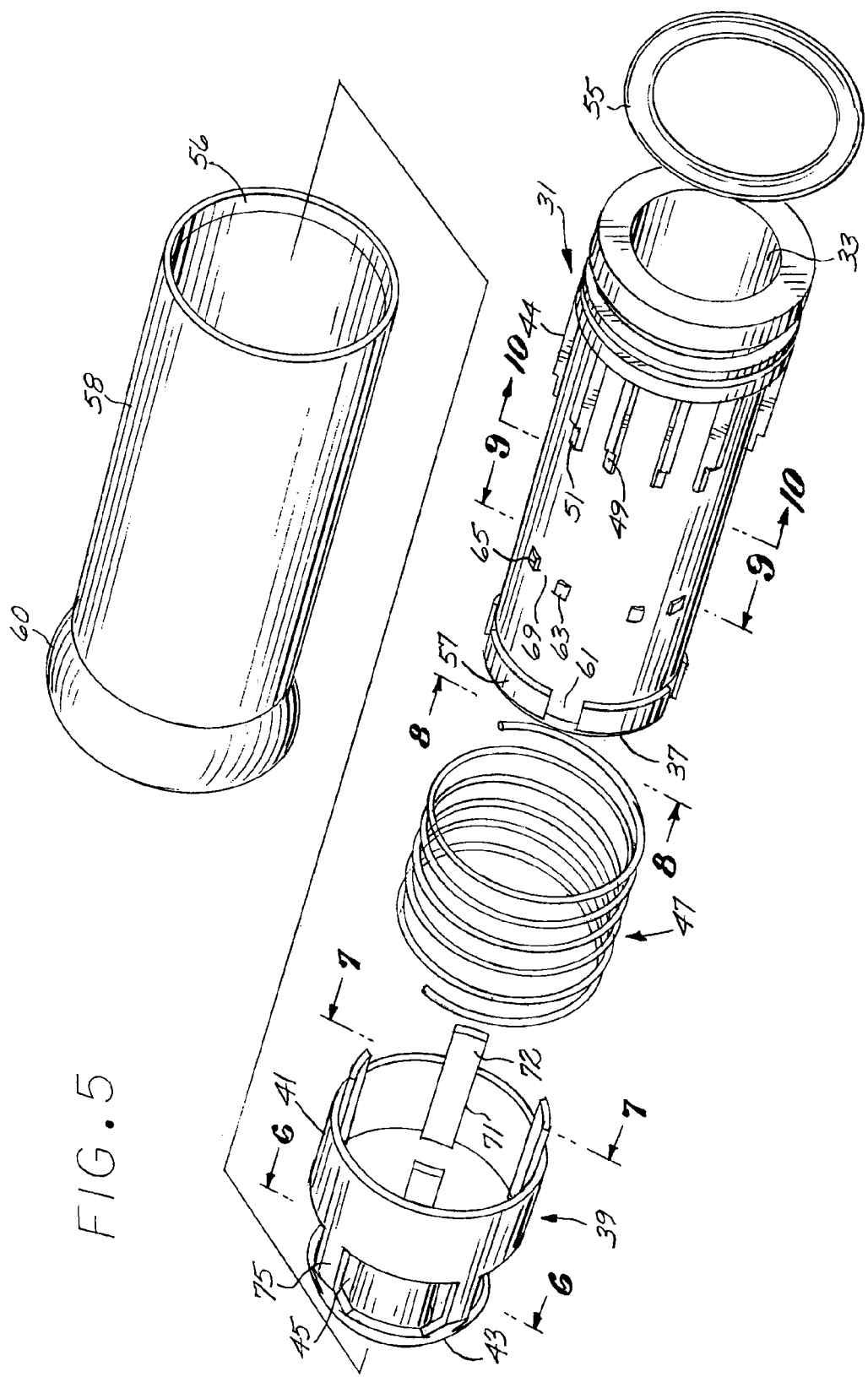
FIG. 5 is an exploded perspective view, in enlarge scale, of the excess flow control valve shown in FIG. 1.
Figure 6:
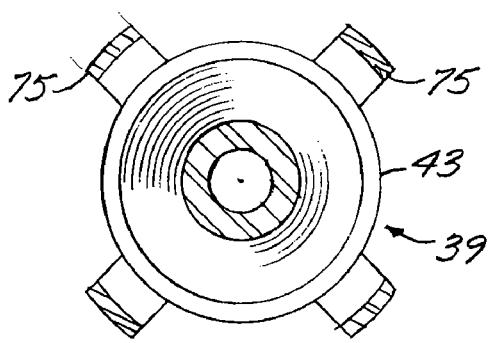
FIG. 6 is a transverse sectional view taken along the line 6-6 of FIG. 5.
Figure 7:
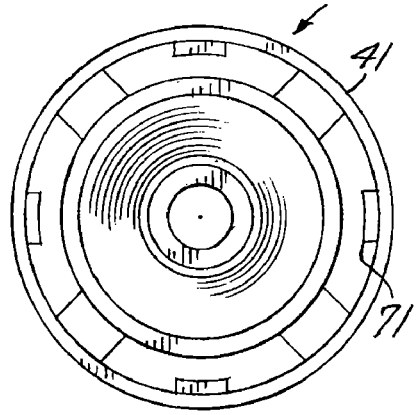
FIG. 7 is a transverse sectional view taken along the line 7-7 of FIG. 5.
Figure 8:
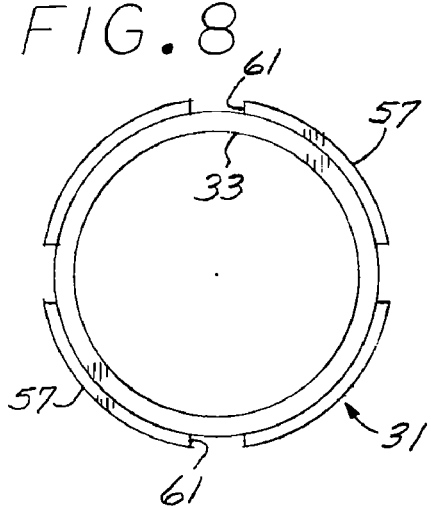
FIG. 8 is a transverse sectional view taken along the line 8-8 of FIG. 5 but rotated 15° about the longitudinal axis.
Figure 9:
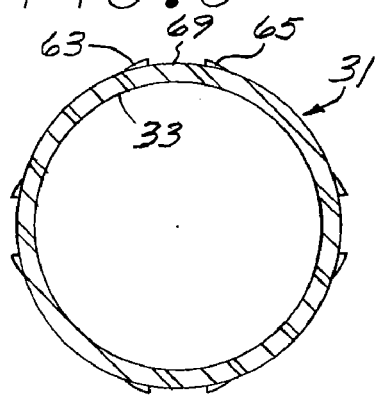
FIG. 9 is a transverse sectional view taken along the line 9-9 of FIG. 5.
Figure 10:
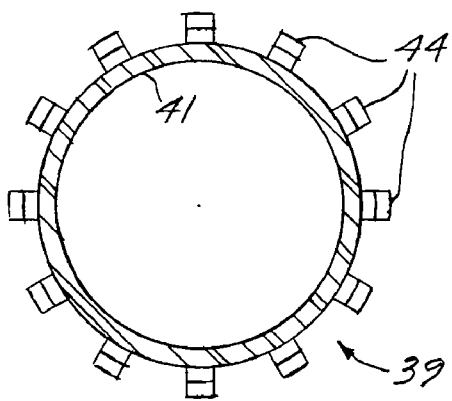
FIG. 10 is a transverse sectional view taken along the line 10-10 of FIG. 5.
Figure 13:
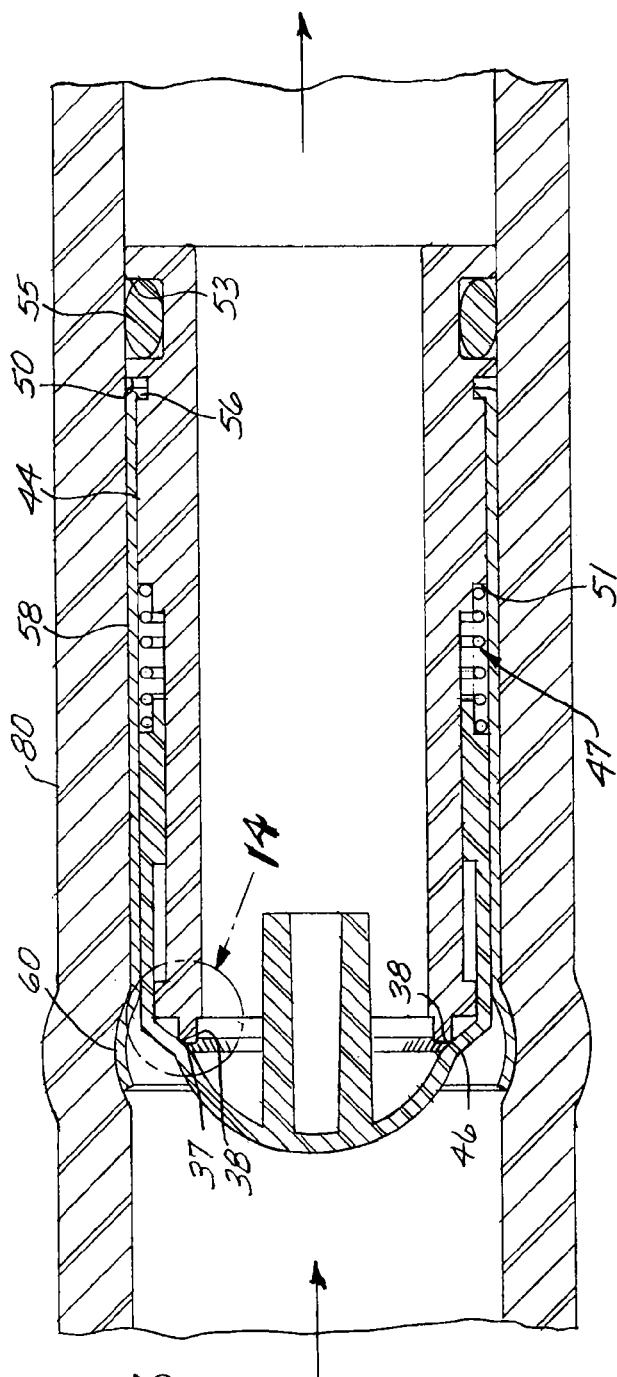
FIG. 13 is a longitudinal sectional view similar to FIG. 11 but showing the valve in its closed position.
Figure 14:
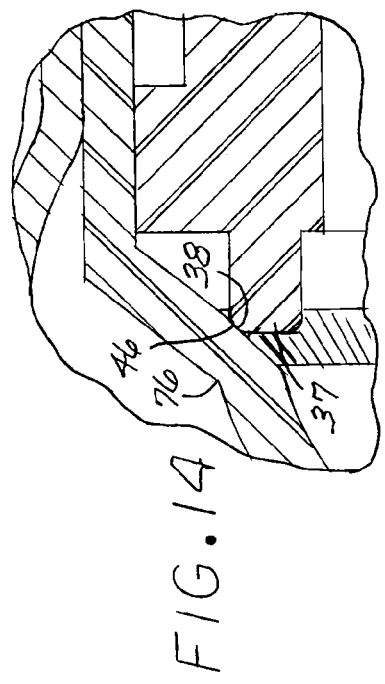
FIG. 14 is a detailed sectional view, in enlarge scale, taken from the circle designating 14 in FIG. 13.

Referring to FIGS. 5 and 11, the excess flow control valve of the present invention includes, generally, a barrel 31 formed with a through flow passage 33 and terminating at its upstream end in a valve seat 37 (FIGS. 13 and 14). A poppet, generally designated 39, includes a mounting ring 41 received telescopically over the barrel 31 for sliding longitudinally thereon and incorporates a cap 43 spaced upstream therefrom to cooperate in forming radial inlet ports 45 and formed at its periphery in an annular downstream facing sealing surface 46. A coil spring 47 is received telescopically over the barrel 31 and biases the poppet 39 upstream with a predetermined force so that flow of gas in the downstream direction as shown by the directional arrows in FIG. 11 will flow radially inwardly through the ports 45 and through the internal flow passage 33 creating a pressure drop across the poppet. In the event, a gas line should burst downstream of the valve, flow will be increased thus increasing the pressure drop across the poppet. When such flow rate reaches the point where the pressure drop across the poppet exceeds the bias force of the spring 47, the poppet will be moved to its closed positioned shown in FIG. 13 engaging the poppet seal surface 46 with the seat 37 to shut off gas flow.

The barrel 31 may be constructed of any desired material such as Zink, steel or plastic or the like and is preferably formed with the interior flow passage 33 expanding slightly radially outwardly in the downstream direction. The barrel is configured at is upstream end with an annular rim rounded off to define a convex edge serving as the seat 37.

The barrel is formed exteriorly towards its downstream extremity with a plurality of axial circumferentially spaced, longitudinal ribs 44 cooperating at their collective radial outer extent to define a cylindrical profile. The ribs terminate at their respective upstream extremities in radially inward cutbacks defining respective upstream facing shoulders 49 and axially upstream projecting stub ribs 51 also cooperating in to form a cylindrical profile reduced in diameter from that of the profile defined by the collative main body of the ribs themselves.

The barrel 31 is formed exteriorly at its downstream extremity with a radially outwardly opening O-ring gland 53 for receipt of an O-ring 55. The exterior of the barrel is formed just upstream of the gland 53 with a radially outwardly annular opening anchor groove 57.

The barrel is formed at its upstream extremity behind the seat 37 with a plurality of radially outwardly projecting circumferential stop ring segments, the confronting radial ends of adjacent segments 57 being spaced circumferentially apart to form therebetween respective axial slider passages 61 (FIG. 5). The exterior of the barrel 31 is further formed medially with a plurality of pairs of circumferentially spaced apart wedge shaped teeth 63 and 65 tapering radially outwardly and circumferentially toward one another cooperating to form between the thick ends of each pair an axial track 69 of a predetermined circumferential width. Such teeth 61 and 65 are positioned to form the respective tracks 69 off set from axial alignment with respective passages 61 so as to be disposed in axial alignment with the medial portions of the ring segments 57.

The poppet may be constructed of injection-molded plastic and the ring 41 is preferably formed with a degree of flexibility so it can spring to some extent from its round cross sectional shape. The poppet ring 41 mounts, spaced equidistant about its radial interior, a plurality of axial sliders 71 which project axially downstream from the downstream end of such ring to form stabilizing tabs 72 formed with a predetermined circumferential width slightly less than the width of the respective tracks 69 between the teeth 63 and 65 to be received in sliding relationship therewith (FIG. 12).

The poppet 39 is configured with axial struts 75 spaced circumferentially equidistance thereabout projecting upstream of the ring 41 and bent radially inwardly on the respective upper extremities to mount the cap 43 and form therebetween the respective radially inwardly opening fluid inlet ports 45. The cap 43 is preferably formed with a semi-spherical upstream convex nose which is configured at its periphery with a frusto-conical flange 76 formed to define the sealing surface 46 on the downstream surface thereof (FIG. 14). The cap is formed centrally with a downstream projecting stem 77 (FIG. 11) configured with an internal lightening bore 79 which expands radially outwardly in the downstream direction along a tooling draft angle.

In practice, it will be appreciated that the components of the excess flow control valve of the present invention may be manufactured by machining, molding or any other of a number of different manufacturing processes well known to those skilled in the art. The barrel 31 may be cast, molded or machined to be formed integrally with the annular gland 53, ribs 44, teeth 63 and 65 and ring segments 57 as well as the annular seat 37. The poppet 39 may be constructed of injection molded plastic. During assembly, the coil spring 47 may be telescoped over the upstream end of the barrel 31 to abut on its downstream end with the rib shoulders 51 (FIG. 5 and 13). The poppet may be moved into position with the respective tabs 72 of the slider 71 slid axially through the passages 61 formed between the respective ends of adjacent pairs of ring segments 57 to slide in the downstream direction into the annular space formed between the coil spring 47 and the exterior of the body to abut the downstream end of the ring 41 against the upstream end of the spring. Forcing the poppet further in the downstream direction will cause the spring 47 to be further compressed allowing the poppet to be shifted axially until the upstream ends of the respective sliders 71 clear the downstream edges of the respective ring segments 57 to free the poppet for rotation relative to the barrel 31. The poppet may then be rotated about such barrel allowing the respective sliders 71 to engage respective ones of the teeth to ride radially outwardly thereon as permitted by flexing out of round of the ring causing such sliders to register with the respective tracks 69 between the respective pairs of teeth 63 and 65 to be received therein. Once the sliders are registered, the inherent resiliency of the ring will drive then radially inwardly in the respective tracks to be held slidably thereon. The workman may then release the poppet 39 permitting the bias in the spring 47 to drive such poppet in the upstream direction as the sliders travel in the respective tracks 69 until the upstream ends thereof strike the downstream edges of the respective ring segments. This serves to bias the poppet to its open position with a force dictated by the spring constant.

My preferred embodiment of the invention includes a tubular annular shroud 58 to be telescoped on the barrel to form a capsule. The shroud 58 will typically be constructed of stainless steel sheet metal or plastic and may be constructed on its downstream end with a radially inturned annular anchor flange 56 having an internal diameter slightly larger than the diameter of the profile for the collective axial ribs 44. The shroud is preferably formed at its upstream extremity with a radially outwardly projecting bead 60. The shroud and bead are formed so the diameter of such shroud is slightly less than the inside diameter of the gas line 80 into which it is to be received and the outside diameter of the bead slightly larger. Such shroud may thus be telescoped over the upstream end of the barrel 31 to pass over the ring segments 57, teeth 63 and 65 and over the ribs 44 to register with the anchor groove 50. The downstream end of the shroud may then be crimped radially inwardly to drive the flange 56 into the ground 50 to anchor such shroud in a fix position relative to the barrel 31. The O-ring 55 may then be inserted over the downstream end of the barrel 31 to be received in the gland 53.

In a typical application, excess flow valves may be inserted in different branch gas lines to individual business establishments or residences. In practice, the walls of the branch lines 80 are typically constructed of polyethylene with some degree of stretch. Consequently, the entire capsule may be inserted into the end of the polyethylene tubing causing the annular bead 60 to stretch the tubing outwardly as the capsule snakes up the line to thus maintain a firm grip thereon. As the valve capsule is driven further into the distribution line, the O-ring 53 will sealingly engage the interior wall of such line to maintain a fluid tight seal when gas is flowed through the valve.

It will be appreciated that the spring 47 is selected with a constant such that when gas flows under normal conditions in the direction of the directional arrows in FIG. 11, it will present sufficient bias to resist the dynamic head applied to the nose 43 of the poppet causing the gas to flow in a more or less laminar pattern over the convex shape of such nose radially outwardly and downstream thereabout to flow radially inwardly through the respective inlet ports 45 and through the relatively unobstructed, rather robust fluid passage 33 in the barrel 31. It will be appreciated that flow through the fluid passage 33 is relatively unrestricted, particularly as influential by the downstream expansion of the passage.

In the event there should be a line burst, leakage or other accident that might result in escape of gas downstream of the valve, it will appreciated that the pressure will drop within such valve causing an increase pressure differential across the valves of the poppet. This will cause the velocity of gas through the inlet ports 43 to increase and flow through the passage 33 to increase thereby further increasing the pressure differential across the poppet to the point where that pressure differential, combined with any dynamic forces from the flow striking the nose 43, overcomes the bias of the spring 47 to thus initiate compression of that spring. As the pressure differential across the poppet overcomes the spring bias, the poppet will be driven downstream relative to the barrel causing the respective inlets 45 to be partially occluded by the side walls of the barrel thus further reducing the pressure within the food passage 33 thereby further increasing the pressure differential across the poppet to the point where the poppet is driven to its closed position engaging the sealing surface 46 on the annular seat 37 (FIGS. 13 and 14) thereby totally closing off flow and preventing any additional escape of gas. It will be appreciated that both the surface of the seat 37 and the sealing surface 38 may be complementally shaped, preferably convex for the seat and a complimentary concave shape for the sealing surface to thereby enhance the positive sealing of the poppet to prevent unwanted escape of volatile gases.

In practice, the foregoing operation for the preferred embodiment will cause the poppet to respond to a precipitous drop in the downstream pressure to abruptly close. It will be appreciated, however, that for some embodiments the poppet may respond to a diminished pressure to partially close thus throttling flow or even seeking a steady state reduced volume flow rate to produce a pressure reduction across the value itself without a complete shut off.

As it will be appreciated by those skilled in the art, it is convenient in the preferred embodiment to position the poppet spring telescopically over the exterior of the valve barrel but that in other embodiments the poppet and its associated bearing ring may take different forms, as for instance, telescoping into the exterior of the barrel wherein, in some instances, the barrel itself may be stepped on the interior to accommodate sliding of such ring. The nose of the poppet is preferably spherical but may, of course, take other forms such as parabolic, pyramidal or even, some instances planes.

From the foregoing, it will be appreciated that the excess flow control valve of the present invention provides an economical and effective means for throttling or stopping flow in the event of a line rupture or the like. The valve provides for minimum flow respective and maximum volume in the gas fluid distribution line and is economical and convenient to manufacture and install. The components are relatively inexpensive to manufacture and are few in number thus rendering fabrication and assembly relatively straight forward.

I claim:

1. An excess flow control valve including:
    a cylindrical open ended barrel having upstream and downstream extremities, the downstream extremity formed exteriorly with a plurality of axial ribs spaced thereabout, the ribs being configured with radial cutbacks defining upstream facing stop surfaces and rib stubs projecting therefrom and cooperating to define a circular pattern, the barrel further including adjacent upstream extremity a plurality of radial stop ring segments spaced thereabout to form between the respective circumferential ends thereof a selected number of clearance passages having a predetermined circumferential width, the body further including respective pairs of teeth disposed medially on the exterior periphery thereof and spaced apart the predetermined circumferential distances to form therebetween the selected number of slider tracks, the slider tracks being rotated relative to the respective clearance passages to be disposed out of axial alignment therewith;
    the barrel further being formed adjacent its downstream end, a spring step surface facing upstream;
    a poppet formed with a cylindrical bearing ring and a semi-spherical cap, the cap connected with the guide ring by longitudinal braces spaced equidistance about the ring to cooperate in forming between the ring and cap respective inlet ports, the ring including on its inner surface thereof the selected number of axial sliders having a width corresponding with the predetermined circumferential distance and configured to be received in sliding engagement through the respective clearance passages and so configured as to allow the cap to then be rotated relative to the barrel to be disposed in the respective tracks between the respective pairs of teeth;
    the ring being formed on one end with a downstream facing spring stop surface;
    a coil spring received over the body and interposed between the spring stop surfaces;
    the body further formed on its downstream end with an external O-ring gland;
    an anchor sleeve receiving the body and formed on its downstream extremity with a radially in turned anchoring flange and formed on its upstream extremity with an outwardly rolled anchoring bead.

2. A method of making an excess flow control valve including:
    fabricating an elongated valve barrel with a through central bore upstream and downstream extremity and forming an exterior surface with a plurality of pairs of teeth spaced circumferentially apart a predetermined distance to form respective slide tracks and forming stop ring regiments spaced axially downstream from but disposed in axial alignment with the respective tracks and spaced axially apart to form therebetween respective clearance passages and position further forming the barrel with a plurality of ribs configured with upstream facing spring stop surfaces;
    fabricating a poppet cage with a resilient bearing ring for telescopically fitting over the upstream extremity of the barrel and forming the ring with a downstream facing peripheral seal;
    forming axial sliders on the interior of the ring configured to be received through the clearance passages;
    selecting a coil spring sized to be received over the barrel;
    telescoping the coil spring coaxially over the barrel to be abutted on one end with the spring stop surfaces; and
    inserting the poppet mounting ring telescopically over the upstream end of the barrel by sliding the sliders through the respective clearance passages to be disposed bodily downstream of the stop ring elements and rotating the poppet relative to the barrel to pass the respective sliders over respective ones of the pair of teeth causing the ring to flex to permit the sliders to clear the respective ones of the pairs of teethes to be aligned in the respective tracts and to be constrained there by the ring for axial sliding therein.

3. An excess flow control valve comprising:
    a hollow body wall formed with an exterior wall and a central, through, flow passage terminating in an upstream end defining a valve seat and further formed medially in the wall with a plurality of pairs of circumferentially spaced apart locator teeth;
    an elongated hollow poppet coaxial with the body, including a bearing ring received over the exterior wall for axial sliding along wall body from a throttling position to an open position, the poppet further including a cap cooperating with the ring to form radial inlet ports and further including a plurality of sliders projecting axially from the ring for receipt between the respective pairs of teeth further including a peripheral poppet sealing surface for, upon the ring being shifted to the throttling position, throttling flow from the ports past the seat into the passage, and
    the body wall even further including adjacent the seat, stop ring segments configured and ranged to form between confronting ends thereof, respective passage ways for selective receipt of the respective sliders, the sliders being so positioned and arranged as to, when the ring is in one rotational position relative to the body, slide axially through the respective passage ways and arrange such that poppet then may be rotated from the one rotational position to locate the respective sliders disposed in axially alignment with the respective ring segments for selective abutment their against to restrict release of the poppet from the body;

a spring interposed between the poppet and body to bias the poppet in the upstream direction.

4. The excess flow control valve of claim 3 wherein:
the body is configured with the ring segments positioning the respective passage ways out of axial alignment with the spaces between the respective pairs of teeth.

* * * * *